INVENTOR
WILLIAM J. McBRIDE
BY Fred Jacob
ATTORNEY

Sept. 17, 1968 W. J. McBRIDE 3,402,396

DATA PROCESSING APPARATUS

Filed July 2, 1965 4 Sheets-Sheet 2

INVENTOR

WILLIAM J. McBRIDE

BY Fred Jacob

ATTORNEY

Sept. 17, 1968 W. J. McBRIDE 3,402,396
DATA PROCESSING APPARATUS
Filed July 2, 1965 4 Sheets-Sheet 3

INVENTOR
WILLIAM J. McBRIDE
BY Fred Jacob
ATTORNEY

INVENTOR

WILLIAM J. Mc BRIDE

BY Fred Jacob

ATTORNEY

United States Patent Office 3,402,396
Patented Sept. 17, 1968

3,402,396
DATA PROCESSING APPARATUS

William J. McBride, Wayland, Mass., assignor to Honeywell Inc., Minneapolis, Minn., a corporation of Delaware

Filed July 2, 1965, Ser. No. 469,269
17 Claims. (Cl. 340—172.5)

ABSTRACT OF THE DISCLOSURE

A data processing system comprising apparatus for addressing and reading out records of a first and of a second kind recorded in a plurality of storage tracks. Each of the records includes its own address as well as a data section. The apparatus further comprises an address storage register and a comparator adapted to compare the contents of the address storage register against the address of a record read out. There are further included means responsive to a true address comparison for transferring the data contents of the corresponding record of the first kind to a utilization device, as well as means responsive to a true address comparison for transferring the data contents of the corresponding record of the second kind to the address storage register. This latter action brings about the subsequent addressing and reading out of records at the address specified by the data contents.

The present invention relates in general to new and improved data processing techniques whereby related information stored at different locations of an information unit may be consecutively accessed with a minimum of outside intervention.

The invention will be explained with reference to a random access card memory system wherein data is recorded on a magnetizable surface of each card. It will be understood, however, that the invention is not limited to magnetic recording and that it is applicable in instances where the information units may take different forms from those described.

Where data is stored on the magnetized surface of a card, it is commonly recorded in a plurality of parallel tracks, each track consisting of an indeterminate number of variable-length records. The search for a desired record can be materially shortened by grouping the records, each such group being referred to as a bucket herein. The bucket in which the desired record is located is first determined through a key assigned to each record and the record is searched for within the bucket. For example, the total number of records may be arbitrarily divided by 100, one hundred records being stored in each bucket. Since the records are of variable length, the size of the bucket is similarly indeterminate. It is also possible for different buckets to contain different numbers of records. Indeed, this is very likely to be the case where the records pertain to items, e.g. insurance policy records, that are subject to addition or deletion. Thus, a bucket may occupy less than one track, or it may extend over several tracks of a single card. It is also possible for a bucket to cover more than one card, although such an arrangement compromises the advantage of rapid access to the desired data.

Each bucket has a general address which may be identified by the card on which it is recorded, the track on which the first record of the bucket appears and, if a bucket does not initiate the track, the number within the track of the record constituting the first record of the bucket. To this end, a decoder may be employed which is responsive to the aforesaid key of the desired record to provide the address (by card number, track number and record number) of the first record of the bucket in which the desired record is stored. Where, for example, each record contains the pertinent data for one policyholder of an insurance company, including his Social Security number, the latter number may be employed as a key. Thus, in the example under consideration, the Social Security number of each of the one hundred records stored in a particular bucket provides, upon being decoded, the address of the first record in that bucket.

Customarily, apparatus of the type described hereinabove operates in association with a data processing system having a central processor, as well as a control unit through which all signals transferred between the card processing apparatus and the central processor are channeled. In the course of a particular operation, e.g. during a record updating routine, a command may be issued by the central processor to search for a desired record, which is known only by the Social Security number forming part of the record. The Social Security number is decoded to provide the bucket address by card and track number and by the number of the first bucket record on the track. The addressed card is selected from its normal storage location and is transported to a data transfer station. The proper track is selected in accordance with the bucket address and is subsequently read out in search of the first record of the bucket.

The search for the desired record within the bucket requires an instruction from the central processor to search and read a record having a specified address. As long as such an instruction is present, or is periodically reissued, that portion of the instruction address which relates to the record number may be automatically incremented in order to search all the records in a given track. Unless consecutive tracks are always sequentially accessed, special steps must be taken when the end of a track is reached. In such a case, heretofore available apparatus requires a separate instruction from the central processor by way of the control unit, specifically informing it of the new address, i.e. of the number of the track on which the records of the same bucket are continued. Where the bucket may start with any record of a track, the record number within the track must also be supplied in such a case. Barring such an instruction from the central processor, a sequential search for the desired record is possible only in a single track or in consecutive tracks.

In the latter case, the flexibility of the entire storage arrangement is severely inhibited. Since the size of a record can generally not be predicted, a bucket limited to a single track may contain only a few records. Where the bucket occupies more than one track which must be consecutively accessed, the addition or deletion of records must occur within the consecutive tracks assigned to the record. If their capacity is exceeded, the addition of records to the bucket must be made in such non-consecutive tracks as are available. In the latter case, the bucket cannot be read out consecutively since readout is limited to consecutive tracks. Clearly, this detracts from the utility of such an arrangement.

In the case where an additional central processor instruction is required, the search for the desired record in a particular bucket is materially extended in time. This is primarily due to the necessity for returning to the central processor for the address of the next record in the bucket. Apparatus for implementing this technique is relatively complex in construction and materially contributes to the cost and maintenance requirements of the entire equipment.

An even more important disadvantage derives from the fact that the program in the central processor must provide the required information. Thus, both central processor storage capacity and central processor time must be provided in order for the required information to be transferred to the equipment by way of the control unit. Finally, additional programming time and effort is required to provide this information in the program, with the attendant possibility of error.

It is a primary object of the present invention to provide data processing apparatus which is not subject to the foregoing disadvantages.

It is another object of the present invention to provide data processing apparatus wherein records are organized into buckets, the search of all the records in a given bucket being automatically carried out.

It is a further object of the present invention to provide apparatus wherein records are organized into buckets and the last bucket record in each track is automatically linked to the first record of the same bucket in a subsequent track.

It is still another object of the present invention to provide relatively simple and economical apparatus for use with records that are consecutively organized within respective buckets, such apparatus being capable of reliably implementing the linking of the last record in a given card track to the subsequent record of the same bucket located in a different track.

These and other objects of the present invention, together with the features and advantages thereof will become apparent from the following detailed specification in conjunction with the accompanying drawings in which.

Figure 1:
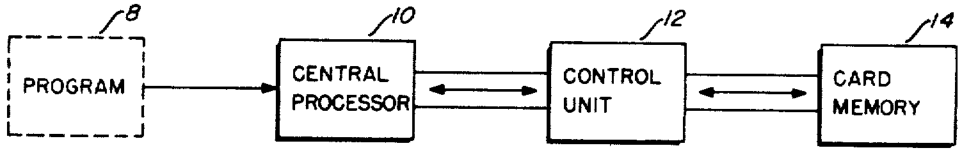
FIGURE 1 illustrates a basic data processing system within which the present invention may find application.

With reference now to the drawings, FIGURE 1 schematically shows a data processing system within which the present invention may find application. A central processor 10 is coupled to a control unit 12 which, in turn, is coupled to a card memory 14. The coupling links are seen to be bidirectional in each case and all signals transferred between the central processor 10 and the card memory 14 must pass through the control unit 12. The central processor is responsive to a program, as indicated at 8 in FIGURE 1, such program generating the order which may result in the search for a desired record.

Figure 3:
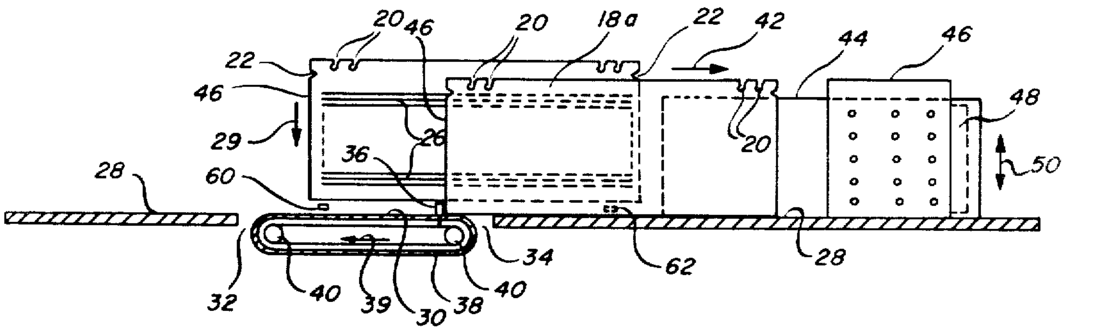
FIGURE 3 is an elevation view of pertinent portions of the apparatus of FIGURE 3.
Figure 2:
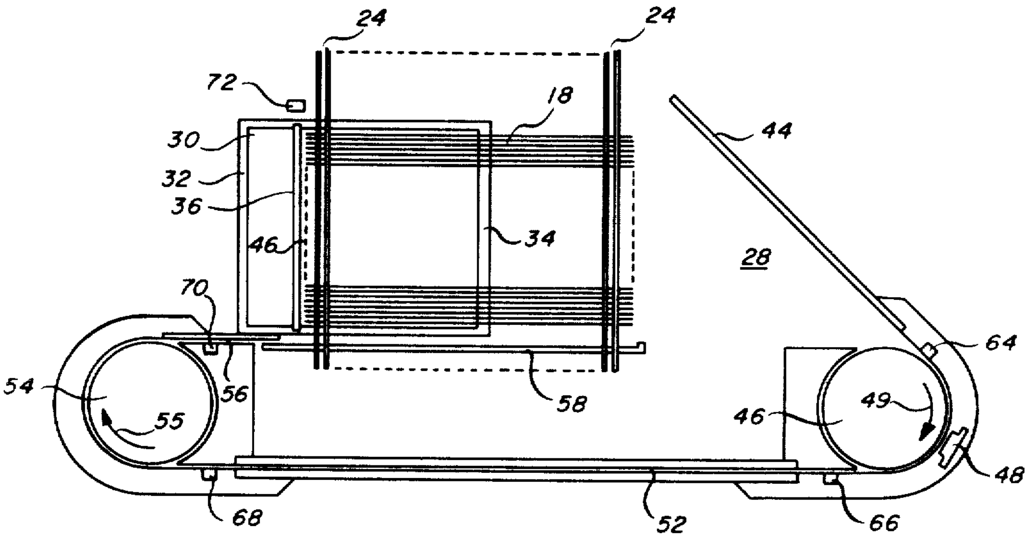
FIGURE 2 illustrates a practical embodiment of a card memory which may find use in the arrangement shown in FIGURE 1.

FIGURES 2 and 3 illustrate in greater detail one practical embodiment of the card memory 14 shown in FIGURE 1, although it will be understood that the present invention is not so limited. The cards are designated by the numeral 18 and are seen to be arranged in a stack, suspended above a reference plane by means of rods which engage suitable slots 20 and 22 in the cards. For the sake of clarity, only the selection rods 24, which engage the notches 20, have been shown. As previously explained, each card has a magnetizable surface on which a plurality of information tracks 26 is recorded. The aforesaid reference plane is defined by a working surface 28 and a waiting platform 30, the latter being spaced from the working surface as shown at 32 and 34. An impelling bar 36 is fastened to a pair of belts 38 which, in turn, engage a pair of pulleys 40. Means, not shown, are provided for selectively actuating the pulleys to impart motion to the belt in the direction of the arrow 39. When the belts are so actuated, the impelling bar 36 is accelerated forward (to the right in FIGURE 3), from its rest position shown in FIGURE 2. The dimensions of the bar are such that it passes without interference underneath the suspended cards. At the end of the waiting platform 30, the impelling bar passes through the space 34, then moves in the reverse direction until it rises through the space 32 and comes to rest again at its original start position, immediately ahead of the leading edges of the suspended cards.

In order to select one of the cards 18 at random, a Seek instruction, together with the card address, is issued by the aforesaid central processor 10. These signals are applied, by way of the control unit 12, to suitable rod actuators (not shown), which rotate selected rods in accordance with the card address. The chosen card then drops to the reference plane in the direction of the arrow 29, in which position it straddles the waiting platform 30 and the working surface 28. A card so selected is labeled **18*a* in FIGURE 3. The impelling bar 36 is then actuated and bears against the trailing edge 46 of the selected card to impart an acceleration to the latter in the direction of the arrow 42. After the impelling bar 36 has dropped through the opening 34, the accelerated card 18*a* continues under its own momentum until it is deflected by a guide 44, which guides the card to a vacuum read capstan 46**.

The read capstan is adapted to rotate at a constant velocity in the direction of the arrow 49 and to retain the arriving card in contact with its external surface by means of vacuum pressure internally applied. A suitable guide structure is provided and surrounds the capstan 46 to form an internal raceway for the card. A magnetic head 48 is positioned to contact the card retained on the rotating read capstan 46 and to effect a data transfer relative thereto. In a preferred embodiment, only a single card track is read out or written into on each pass of the card past the magnetic head 48. For reasons of economy the number of cores in the head 48 is preferably less than the total number of card tracks, so that the head must have freedom to move in the direction of the arrow 50 in order to engage selected tracks.

The card is released from the read capstan 46 when the desired data transfer has been completed and enters an external raceway 52. Here the card moves under its own momentum until it arrives at and is held in contact with a vacuum return capstan 54. The return capstan preferably rotates in the direction of the arrow 55, at a constant velocity less than that of the read capstan. The return capstan thus decelerates the card and changes its direction of motion by 180° before releasing it into another external raceway 56. From there the card moves into contact with a lift plate 58 where it is arrested, raised opposite the suspended cards and urged back onto the rods.

It will be apparent from the foregoing discussion that a card may be selected at random from its stack, then retained on the read capstan 46 as long at required to read out the desired number of tracks and subsequently returned to the stack. While the card is on the capstan, any track may be accessed, the data within each track being consecutively read out. It will be understood that suitable interlocks and controls are provided to govern card selection, card travel, data transfer and card return. Appropriate signals to carry out this purpose may be derived from seinsing means, e.g. photocells located along the card path, such as are shown at 60, 62, 64, 66, 68, and 70. Control signals are further derived from such sensing means as 72, which sense the presence of the impelling bar, as well as from the head 48.

Figure 4:
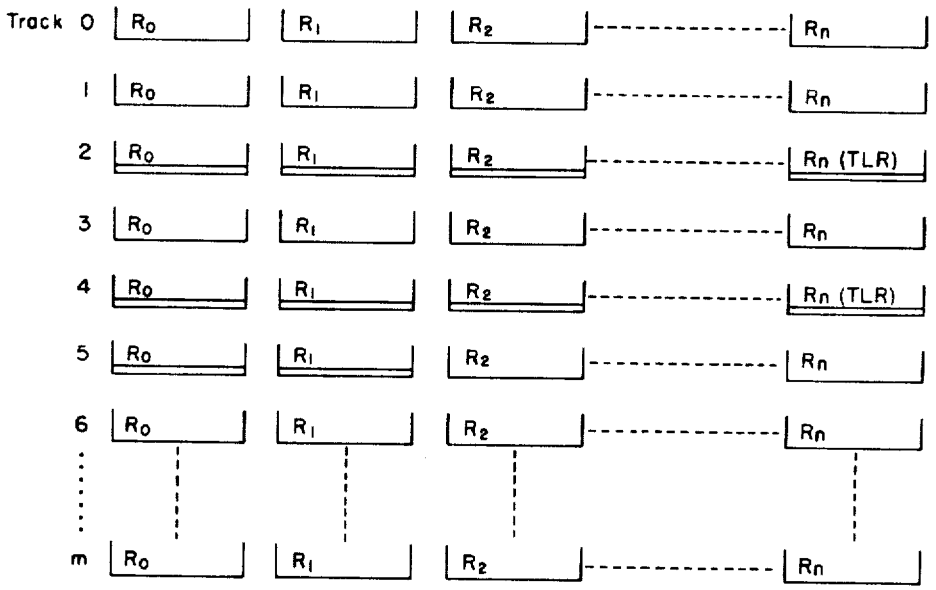
FIGURE 4 illustrates a possible arrangement of tracks on a single card illustrating the present invention.

With the operation of the above-discussed card memory in mind, it is appropriate to turn to a consideration of the organization of data on a single card, as shown in FIGURE 4. Tracks 0 to *m* are shown, it being understood that the total number of tracks will vary in accordance with such practical considerations as the amount of information to be stored on the card, permissible cross talk, maximum recording density, the size of the card, etc. In a practical embodiment of the invention, 128 tracks are stored on a card whose dimensions are 7⅜ by 3¼ inches.

Within each track, the records are designated $R_0$, $R_1$, $R_2$, . . . $R_n$ and are spaced from each other by fixed gaps. As previously explained, the arrangement of a related number of records into buckets can greatly speed up a search, especially where large numbers of records are involved. In FIGURE 4, a single bucket is indicated by representing each record belonging to the bucket with a double line. Thus, all the records in Tracks 2 and 4 belong to the bucket under consideration, as do records $R_0$ and $R_1$ in Track 5. The address of the first record in the bucket, i.e. the record $R_0$ in Track 2, is the address of this bucket.

As previously explained, in prior art apparatus the size of a bucket was inflexibly limited to a single track or to consecutive tracks, unless a new instruction was obtained from the central processor by way of the control unit, giving the address of the record in a subsequent track where the bucket was continued. As explained above, the latter procedure takes time and is wasteful insofar as it serves to tie up the storage and control capacity of the central processor. Additionally, it involves the programmer's effort and time with an attendant chance for error.

In accordance with the present invention, a technique is provided which allows the operation to be carried out without recourse to the central processor for the address of the next record. Thus, the last bucket record in each track stores the address of the next record in a subsequent track which continues the bucket. Accordingly, the last record in Track 2 of FIGURE 4 is a track-linking record (TLR), which stores the address of record $R_0$ in Track 4. Similarly, record $R_n$ in Track 4 is a track-linking record of the same bucket, which stores the address of record $R_0$ in Track 5. It is again pointed out that the records $R_0$ in Tracks 2, 4 and 5 have been chosen for the sake of illustration only, but that the bucket may be initiated or continued respectively, by any record of the appropriate track. Similarly, the invention is not limited to a condition wherein only the last record of a track may be a track-linking record. While the latter situation is ordinarily desirable due to the sequential readout (or recording) of data in a given track, it would be equally possible for a record such as the record $R_2$ in Track 4 to be a track-linking record.

Figure 5:
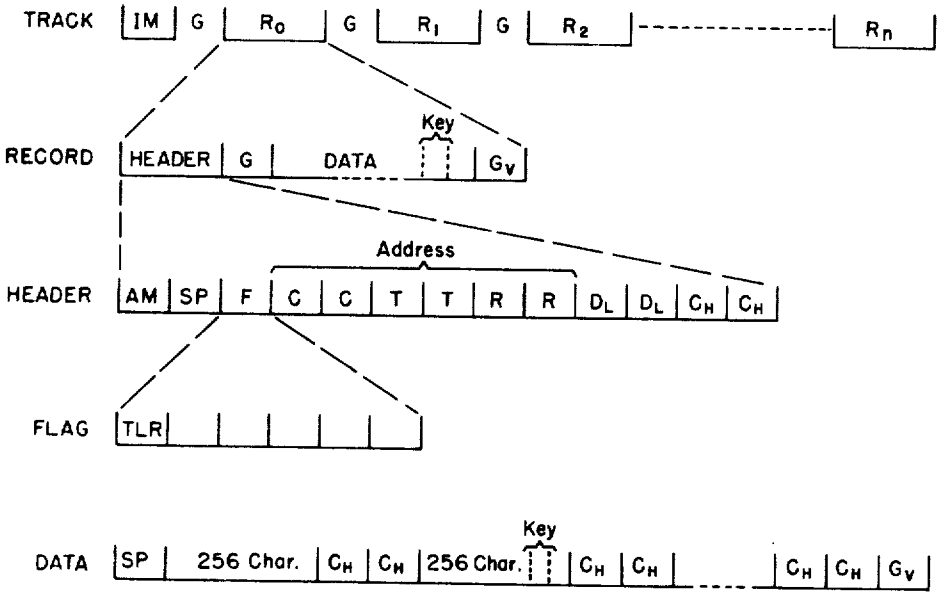
FIGURE 5 illustrates in greater detail the contents of a single track in a preferred organization.

FIGURE 5 illustrates a preferred organization of information within each track. The track is seen to be initiated by an Index Marker IM, indicative of the beginning of the track. The index marker may merely constitute the leading edge of the card which is detected by suitably positioned sensing means, e.g. by the photocell 64 in FIGURE 2. The index marker is succeeded by a gap, following which the first record of the track, i.e. the record $R_0$, is recorded. Successive records are seen to be equally spaced from each other by appropriate gaps G.

A representative record $R_0$ is shown in greater detail in FIGURE 5. The record is initiated by a header portion succeeded by a fixed gap G, which is in turn followed by the data portion of the record. The data portion includes the aforesaid key and is terminated by a variable gap $G_v$.

The header portion is separately shown in detail in FIGURE 5 and is seen to contain an address marker AM which may constitute a special frequency indicative of the presence of a record. The address marker is succeeded by a start pattern SP, which is preferably a synchronous pattern of recorded pulses adapted to synchronize the operation of the read recovery circuitry in the control unit. Following the start pattern SP, there appears a sequence of 6-bit characters, each recorded serially. The first character is termed a flag character F, the function of which will be explained in greater detail below.

Following the flag character, the address of the record $R_0$ is recorded. The latter includes the characters, C, C, indicative of the appropriate card number; the characters T, T, indicative of the track number; and the characters R, R, indicative of the record number. Thus, the record header portion includes a statement of the complete address of the record whose data portion is subsequently recorded.

Following the address portion, the header portion further includes the characters $D_L$, $D_L$, which are indicative of the length of the subsequent data portion. The header is terminated by two check characters $C_H$, $C_H$, which are utilized to check the correctness of the information recorded in the header.

As explained above, each character is composed of six bits. The first bit of the flag character F is the track-linking record bit, which is designated TLR in FIGURE 5 and which uniquely identifies a track-linking record. In a preferred embodiment of the invention, this bit is binary 1 only when it appears in a track-linking record, e.g. in the records $R_n$ in Tracks 2 and 4 respectively, as shown in FIGURE 4. For the record $R_0$ which is under consideration here, the TLR bit is binary 0. The remaining five bits of the flag character are allocated to various control functions which assure the proper operation of the subject apparatus. For example, some or all of the information recorded here may be employed in the operation of the circuitry for reading out or for recording information, to assure that no less of data occurs during the data transfer. Since these bits have no direct bearing on the subject invention, they need not be considered further here.

The data portion of the record, which is separately shown in detail in FIGURE 5, is seen to include a start pattern substantially identical to that shown in the header portion and adapted to synchronize the operation of the read recovery circuitry. In a preferred embodiment of the invention, 256 characters are recorded subsequent to the start pattern and are in turn succeeded by two check characters $C_H$, $C_H$. Following the latter, another 256 data characters are recorded in the data portion, which are again succeeded by two check characters. The organization of the data portion of the record is thus repeated, until terminated by the aforesaid variable gap $G_v$. As shown in FIGURE 5, the key located at some point in a sequence of 256 data characters.

If the record under consideration is a track-linking record in accordance with the present invention, only the address of the linked record appears between SP and $C_H$ in the data portion of the record. For example, the data portion of the record $R_n$ in Track 2, as shown in FIGURE 4, will contain the address of the $R_0$ in Track 4. Similarly, the data portion of the record $R_n$ in Track 4 will contain the address of the record $R_0$ in track 5.

Figure 6:
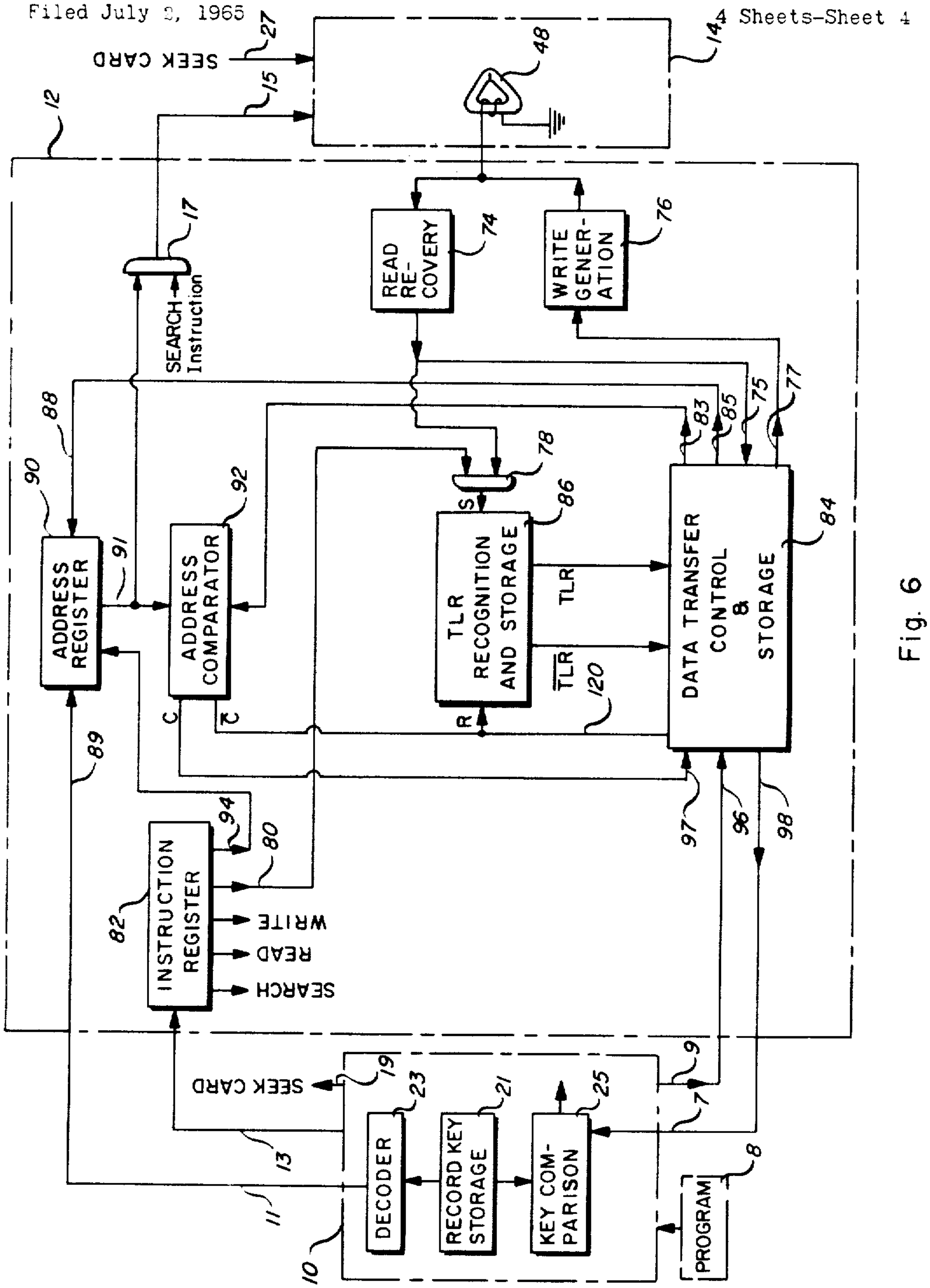
FIGURE 6 illustrates in schematic form a preferred implementation of apparatus for reading out the card shown in FIGURES 4 and 5.

FIGURE 6 illustrates a preferred embodiment of the present invention, applicable reference numerals having been retained. The magnetic head 48 of the card memory 14 is connected to a read recovery circuit 74, as well as to a write generation circuit 76, all located in the aforesaid control unit 12. The implementation of the units 74 and 76 will, in each case, depend on the magnetic recording technique employed and is adequately described in the literature so as to require no further explanation here. The output of the read recovery circuit 74 is connected to one input of an AND gate 78, whose other input is connected to an output 80 of an instruction register 82. The latter register may constitute an ordinary storage register of a kind well known in the art. The output of the unit 74 is further connected to an input 75 of a data transfer control and storage unit 84. An output 77 of the unit 84 is connected to apply signals to the write generation circuit 76.

The output of the gate 78 is connected to the set input of a flip-flop 86 which is designated as a track-linking recognition and storage circuit in FIGURE 6. The unit 86 has two outputs, designated TLR and $\overline{TLR}$ respectively, both of which are seen to be connected to the unit 84. A further output 85, of the unit 84 is connected to the input 88 of an address register 90. An additional input 89 of the latter register is connected to an output 11 of the aforesaid central processor 10. The address register may constitute an ordinary storage register of a kind well known in the art. The output 91 of the address register 90 is connected to an address comparator 92 which has an additional input connected to a further output 83 of the unit 84.. The address comparator is capable of comparing two binary digital signals and to issue a responsive true comparison signal at one output C, or a false comparison at another output $\bar{C}$. Circuitry for carrying out the aforesaid comparison is well known in the art and need therefore not be explained in detail herein.

The output of C of the unit 92 is connected to an additional input 97 of the unit 84. The output $\bar{C}$ is buffered to the reset input of the aforesaid flip-flop 86 together with an additional output 120 of the unit 84. The instruction register 82 is connected to an output 13 of the central processor 10. An output 94 of the instruction register is connected to a further input of the address register 90. The instruction register further includes separate outputs designated "Search," "Read" and "Write" respectively, which provide appropriate instruction signals as explained in greater detail hereinbelow. The Search instruction output of the instruction register 82 is coupled to one input of an AND gate 17. A second input of the latter gate is connected to the output 91 of the address register 90. The output of the gate 17 is connected to an input 15 of the card memory 14.

Component portions of the central processor have been illustrated in FIGURE 6 only to the extent that their discussion is pertinent to an understanding of the present invention. A record key storage unit 21 in the nature of a storage register is adapted to receive and store the key extracted from the data portion of a record on which an operation is to be performed, as determined by the program 8. A decoder 23 is responsive to the aforesaid key to provide at the output 11 the address of the appropriate bucket in which the record is stored. Decoding circuits of this type are well known in the art and hence they need not be further discussed. A key comparison unit 25 is connected to the unit 21 and to an input 7 of the central processor. The latter input is coupled to an output 98 of the unit 84. The unit 25 may consist of one of a number of well known comparators adapted to indicate true or false comparisons between the signals applied to its respective inputs.

An output 9 of the central processor is connected to an input 96 of the unit 84 and is adapted to transfer information that is to be written into a record. An output of the central processor labeled 19 is adapted to issue a Seek Card instruction. The latter instruction is coupled to an input 27 of the card memory 14.

Figure 7:
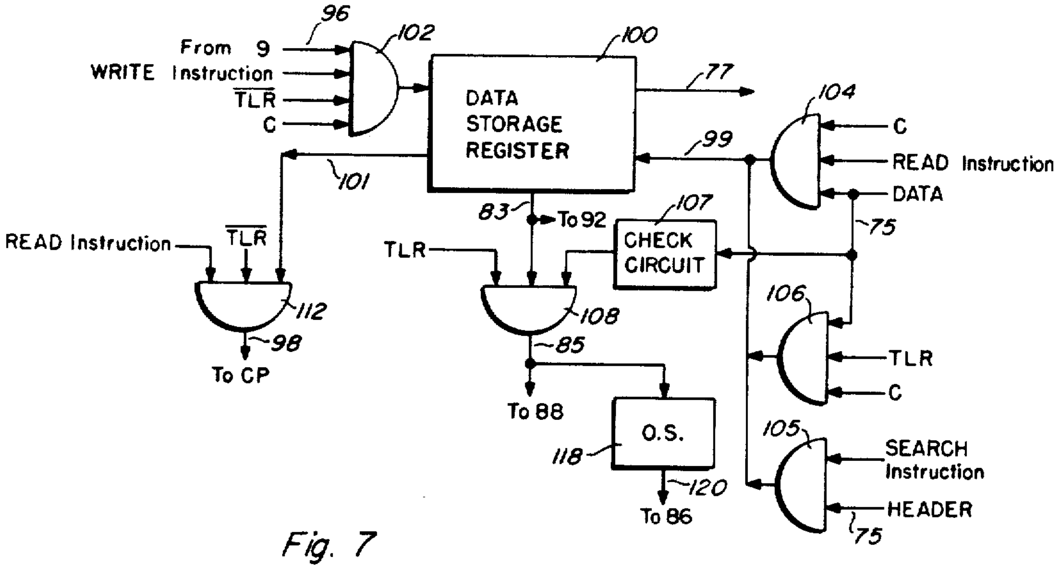
FIGURE 7 illustrates in greater detail a portion of the apparatus of FIGURE 6.

FIGURE 7 illustrates in greater schematic detail the logical circuit arrangement of the unit 84 shown in FIGURE 6. As before, applicable reference numerals have been carried forward. A bidirectional data storage register 100 has one input connected to the output of an AND gate 102. The latter gate has a first input 96 connected to the output 9 of the central processor 10; a second input on which a Write instruction is received from the appropriately labeled output of the instruction register 82; a third input to which the $\overline{TLR}$ condition is signaled from the appropriate output of the unit 86; and a fourth input connected to the output C of the unit 92 and indicative of a true address comparison. The latter input is identical with the input 97 in FIGURE 6. Another input of the register 100 is designated 99 and has the outputs of three AND gates, 104, 105 and 106, buffered thereto. One input of the gate 104 is connected to the aforesaid output C of the address comparator 92. Another input receives a Read instruction register from an output of the instruction 82 and a third input, identical with the aforesaid input 75, receives information from the output of the read recovery circuit 74.

The input 75 also couples data to one input of the gate 106, which has further inputs connected to the outputs TLR and C of the units 86 and 92 respectively. The gate 105 similarly has one input connected to the input 75 on which the header portion of a record is received. A further input of the gate 105 receives a Search instruction signal from the correspondingly labeled output of the register 82.

A check circuit 107 also receives data from the input 75, its output being shown connected to one input of a gate 108. Additional inputs of the gate 108 are connected to the aforesaid TLR signal output of the unit 86, as well as to an output 83 of the register 100 which is identical with the correspondingly designated output 83 of the unit 84 in FIGURE 6. It will be understood that the check circuit 107 is widely employed, but that only its connection to the gate 108 is shown as necessary to an understanding of the present invention. The output of the gate 108, which is identical to the correspondingly labeled output in FIGURE 6, is connected to a one shot multivibrator 118. The output of the latter unit constitutes the previously discussed output 120 which is coupled to the reset input of the flip-flop 86.

A further output 101 of the register 100 is coupled to one input of a gate 112, which further receives the signal $\overline{TLR}$ on a second input thereof and the aforesaid Read instruction on a third input. The output of the gate 112 is identical with the output 98 illustrated in FIGURE 6 and is designated accordingly. An output 77 of the register 100 is identical with the like-designated output of the unit 84 in FIGURE 6.

In order to explain the operation of the present invention, let it be assumed that an updating operation is to be performed wherein the contents of the record $R_2$ in Track 4, hereinafter referred to as the desired record, are to be changed in accordance with newly received or computed information. In carrying out the operation, the key of the desired record is placed into storage in the unit 21 of the central processor 10. Upon being decoded in the decoder 23, the general bucket address of the desired record is obtained. The latter, as previously pointed out, is the address of the first record in the bucket, i.e. the address of the record $R_0$ in Track 2, as shown in FIGURE 4. The bucket address appears at the output 11 of the central processor and is loaded into the address register 90, so that the register output 91 becomes active. It will be seen, with reference to FIGURE 5, that the address includes the number of the card on which this record is recorded, the number of the track on the card and the number of the record on the track.

A Seek Card instruction is issued by the central processor and is applied to the input 27 of the card memory 14. This instruction, which includes the address of the card as derived at the output of the decoder 23, causes the card selection mechanism of the card memory 14 to be addressed through signals applied to the input 27. The rods on which the addressed card is suspended are rotated and the card drops to the waiting platform. The impelling bar accelerates the card, which arrives at the read capstan 46 and is transported past the magnetic head 48.

Following the generation of the Seek Card instruction, the central processor issues a Search and Read (S&R) instruction at its output 13, which is loaded into the instruction register 82 and causes the appropriately labeled output of the latter to become active. The gate 17 now becomes conductive to apply a signal to the input 15 of the core memory 14 indicative of the track address portion of the bucket address, specifically, the address of the Track 2. Track selection now takes place by positioning the head 48 to bring one of the cores opposite the addressed track and/or by switching the appropriate core into the read recovery circuit.

Track 2 is now read out serially through the appropriate core of the magnetic head 48 and the read recovery circuit 74. When the Read instruction is first issued, the card may or may not be in position for reading out the first record of the bucket. Assuming that readout is initiated at the beginning of Track 2, the track index marker will first appear and is succeeded by a gap before the record $R_0$ starts. See FIGURE 5. Following the gap, the address marker and the start pattern of the record are read out, immediately succeeded by the flag character.

The output 80 of the instruction register 82 operates to become true only at such time as the TLR bit of the flag character in each record is read out. The gate 78 is thus periodically enabled to search for a track-linking record, i.e. a record wherein the TLR bit is binary 1. This is true only, however, when a Search and Read Next or Search and Write Next instruction exists. During a Search and Read instruction, or during a Search and Write instruction the addressed record of a bucket is not ordinarily a track-linking record, unless the latter record itself is the desired record. Thus, in the situation under consideration, neither input of the gate 78 becomes true and the gate 78 remains non-conductive. The flip-flop 86 remains in its normal reset state and the output $\overline{TLR}$ is true.

The gate 105 is enabled by the presence of a Search instruction. As seen from FIGURE 7, only the header portion of a record, which is recognized by its address marker AM, is read into the register 100 through the gate 105. Thus, following the flag character in the header of the record $R_0$, the address portion of the record $R_0$ is read into the data storage register 100. The aforesaid record address, which now appears at the output 83, is thus coupled to the address comparator 92. The address comparator 92 now compares the address in the register 100, i.e. the address of the record read out, against the address previously loaded into the register 90 from the central processor. In the absence of an error, a true address comparison signal is derived at the output C of the comparator 92.

Following the readout of the header portion of the record $R_0$, the data portion of the same record is read out through the gate 104, which is enabled by the existence of a Read instruction and by virtue of the fact that the input C is true. The data portion of the record $R_0$ is read into the data storage register 100, whence it appears at the register output 101. The gata 112 is enabled by the presence of the aforesaid Read instruction and by the input $\overline{LTR}$ which is true due to the fact that $R_0$ is not a track-linking record. Accordingly, the data portion of the record $R_0$ is transferred, by way of the output 98, to the input 7 of the central processor 10.

As previously explained, it is possible for the Read instruction to become effective after the record $R_0$ has moved past the magnetic head 48. In such a case, false address comparison signals are derived at the output $\overline{C}$ of the unit 92. The gate 104 then does not become conductive until the record $R_0$ again moves under the magnetic head. Accordingly, data from the successive records of a bucket can be transferred to the central processor only in sequence.

The data received at the input 7 of the central processor is applied to the key comparison unit 25, where it is compared against the key of the desired record which is stored in the unit 21. If no coincidence is obtained, a Search and Read Next (S&RN) order is issued to the instruction register 82 by way of the output 13. In response, the outputs labeled "Search" and "Read" respectively of the unit 82 become active. Additionally, the output 94 of the instruction register now becomes active, causing the address residing in the address register 90 to be incremented by one. In the case under consideration, the card and track numbers will remain the same, but the record $R_1$ will now be addressed.

The above-described operation is essentially repeated for the record $R_1$. The new Search instruction now causes the header of the record $R_1$ to be read into the data storage register 100, by way of the gate 105. Since a S&RN instruction now exists, the output 80 of the unit 82 becomes active. The TLR bit in the flag character of the record is therefore examined by the gate 78 and the address portion of the header is compared in the unit 92 against the new address residing in the register 90. A true address comparison in the presence of a Read instruction is again effective to transfer the data portion of the record into the register 100 by way of the gate 104 and, subsequently, to the central processor 10 through the gate 112.

Search and Read Next instructions are issued by the central processor as long as no true comparison is obtained with the key of the desired record. The above-described operation thus continues as long as successive records in Track 2 are examined which are not track-linking records. In the assumed example, as illustrated in FIGURE 4, the record $R_2$ in Track 4 is the desired record which is to be updated and the record $R_n$ in Track 2, is a track-linking record, i.e. its TLR bit is binary 1. When the record $R_n$ arrives and is examined by the gate 78, the latter becomes conductive and the flip-flop 86 is switched to its set state. The output TLR of the unit 86 is now true, such output being applied to the gates 106 and 108 respectively.

The header of the record $R_n$, which contains a statement of its own record address, is read into the storage register 100 through the gate 105, in the same manner as discussed above. As before, a comparison of this address is carried out in the unit 92 against the address stored in the register 90, so that the output C becomes active if a true comparison is obtained. As previously explained, the data portion of the track-linking record $R_n$ contains the address of the linked record in the bucket, in the present example the address of the record $R_0$ in Track 4. This address is now read into the register 100 by way of the gate 106, the inputs TLR and C of the latter gate being true at this time.

The gate 112 will not conduct at this time because the input $\overline{TLR}$ is not true. Accordingly, the address of the linked record is not transferred to the central processor. If the data portion of the record $R_n$ was read out without error, the output of the check circuit 107 is true. Since the TLR output of the unit 86 is similarly true at this time, the gate 108 becomes conductive to transfer the address of the linked record from the output 85 of the data storage register to the input 88 of the address register. A new address is thus loaded into the register 90 and supersedes the address previously stored therein. Upon the completion of the aforesaid transfer, the one shot 118 is activated to reset the unit 86. The new address appears at the output 91 and, since the Search instruction remains active, it is applied through the gate 17 to the input 15 of the card memory 14. The magnetic head 48 is repositioned to bring the appropriate core opposite the Track 4 and/or the latter core is electronically switched in. Track 4 is now ready for readout.

When the record $R_0$ of Track 4 arrives under the magnetic head 48, its address is compared against the new address stored in the register 90, such comparison being carried out in the comparator 92, as previously explained. Provided no errors have occurred, a true address comparison is obtained and the data portion of the record $R_0$ in Track 4 is read out to the central processor 10, by way of the data storage register 100 and gate 112, as explained above. In the absence of a true key comparison in the central processor, a Search and Read Next instruction is issued, as before. The output 94 of the register 82 becomes active and the address in the register 90 is incremented by 1 to call for the record $R_1$ in Track 4.

When the key portion of the desired record, i.e. the record $R_2$ in Track 4, is reached, a true comparison is signaled at the output of the unit 25 in the central processor. A suitable signal is now sent to the instruction register 82 from the central processor output 13. The register output 94 becomes inactive and the previous address, i.e. the address of the record $R_2$ in Track 4, is retained in the address register 82. A Search and Write (S&W) instruction is now issued by the central processor to the instruction register 82, the appropriately designated outputs of the latter unit becoming actve.

It will be clear that by the time the "Search" and "Write" outputs respectively of the register 82 become active, the record $R_2$ in Track 4, which is to be updated, will have moved out from under the magnetic head 48. The record must therefore be updated on its next pass under the head. The address portions of successive records of Track 4, moving under the head 48, are compared against the address stored in the register 90 in a manner similar to that discussed above. When the record $R_2$ in Track 4 rotates under the head 48 for the second time, a true address comparison is obtained and the output C of the unit 92 becomes true.

The gate 102 is enabled at this time since the inputs $\overline{TLR}$, C and the Write instruction are all active. The new data, which appears at the output 9 of the central processor at this time, is loaded into the register 100 by way of the input 96. From there, this data is transferred out to the Write Generation circuit 76, by way of output 77. The appropriate recording in the data portion of the record $R_2$ is then made by the selected core of the head 48.

The function of a track-linking record during a Search and Write Next instruction is identical to that discussed above in connection with a Search and Read Next instruction. Where a Search and Write Next instruction exists, data may be written into a record through the gate 102, preceded in each case by the readout of the header portion through gate 105. When a track-linking record is reached, its header portion is similarly read out through the gate 105. The data portion, however, which contains the address of the linked record to be stored in the address register 90, cannot be read out through the gate 104, the latter being non-conductive now. Accordingly, if TLR and C are both true, the aforesaid data portion is read out through the gate 106 and is subsequently transferred to the address register 90 by way of the register 100. Thereafter, the gate 102 may again become effective for writing data into a record.

From the foregoing explanation, it will be apparent that the present invention provides a technique whereby a bucket of records may be stored on separate tracks, the last record in each track causing the next record in a subsequent track to be addressed automatically and without recourse to the central processor for a new address. As previously explained, the invention is not limited to cases where the first record in a track initiates or continues a bucket. Similarly, a track-linking record need not be the last record in a track. It will also be apparent that a record may be recorded on more than one card. The invention is neither limited to card memories specifically, nor generally to magnetic recording and readout apparatus. It has application wherever related units of information, whatever their form, are to be linked together sequentially.

What is claimed is:

1. In a data processing system, means for reading out records of a first and of a second kind distinguishable from each other, each of said records including its own address as well as a data section, data utilization means, address storage means, means for comparing the contents of said address storage means against the address of a record read out, means responsive to a true address comparison for transferring the data contents of the corresponding record of said first kind to said utilization means, and means responsive to a true address comparison for transferring the data contents of the corresponding record of said second kind to said address storage means.

2. The apparatus of claim 1 and including means for uniquely recognizing records of said second kind adapted to generate a responsive signal, said last-recited transfer means being connected to effect a data transfer only in the presence of said signal.

3. The apparatus of claim 1 wherein records of said first kind are successively stored in at least a pair of tracks on a storage medium, each address including record and track number portions, a record of said second kind terminating the first track of said pair and containing in its data section the address of the subsequent record of said first kind stored in the second track of said pair, means for successively incrementing the record number portion of an address stored in said address storage means, said readout means being responsive to the contents of said address storage means to address successive records of the track called for by said track number portion.

4. The apparatus of claim 3 wherein said tracks are disposed on the magnetized surface of an information unit, said records being magnetically recorded in said tracks.

5. The apparatus of claim 3 wherein the data section of each record of said first kind includes a key, the records stored in said pair of tracks constituting a group of successive records related by their keys, said data utilization means including decoding means responsive to each of said keys for generating the address of the first record in said group, means for comparing the key of a record under search against each key included in the data contents transferred for respective records of said first kind, and means responsive to each false key comparison for activating said incrementing means.

6. The apparatus of claim 5 and further including means for recording said records in said tracks, and means responsive to a true key comparison for transferring data from said utilization means to said recording means.

7. In a data processing system, means for reading records of a first and of a second kind distinguishable from each other out from an information unit, each of said records including its own address as well as a data section, data utilization means, address register means adapted to store a record address, control means coupled to said readout means and to said utilization means, address comparison means connected to compare an address read out through said control means against an address stored in said address register means, means responsive to a true address comparison corresponding to a record of said first kind for transferring the data contents of said last-recited record through said control means to said utilization means, and means responsive to a true address comparison corresponding to a record of said second kind for transferring the data contents of said last-recited record through said control means to said address register means.

8. The apparatus of claim 7 wherein said records are successively stored in tracks on said information unit, each address including record and track number portions, said records being organized by groups respectively capable of occupying more than one track, each track of a multi-track group, except the last track thereof, containing a record of said second kind positioned to terminate a track of records of said first kind, each record of said second kind containing in its data section the address of the next record of said first kind stored in the subsequent track of the group, means for successively incrementing the record number portion of an address stored in said address register means, said readout means being responsive to the contents of said address storage means to address successive records of the track called for by said track number portion.

9. The apparatus of claim 8 wherein the data section of each record of said first kind includes a key, the records of each group being related by their keys, said data utilization means including decoding means responsive to the key of a record under search for generating the address of the first record of the group in which said searched for record is located, means for comparing said last-recited key against each key included in the data contents transferred for respective records of said first kind, and means responsive to each false key comparison for activating said incrementing means.

10. The apparatus of claim 9 and further including means for recording said records in said tracks, and means responsive to a true key comparison for transferring data from said utilization means to said recording means by way of said control means.

11. The apparatus of claim 9 wherein said information unit consists of a card having at least one magnetized surface, said records being magnetically recorded in said tracks which are disposed on said surface, said card being normally positioned in a stack of similar cards, each address further including a card number portion, and means responsive to the address generated by said decoding means for addressing the card in said stack called for by the card number portion of said generated address.

12. The apparatus of claim 7 and including recognition means coupled to said readout means for signaling the kind of record read out, said control means being responsive to said recognition means to permit the transfer of data to said address register means only in the presence of a record of said second kind.

13. The appartus of claim 12 wherein said control means include a data storage register, means for gating the address portion of a record to a first input of said data storage register, means responsive to a true address comparison for gating the data portion of a record to said first input, said data storage register including a first output adapted to provide said record address portion thereon and being coupled to said address comparison means, means responsive to a signal from said recognition means indicative of a record of said second kind for gating signals derived at said first output to said address register means, said data storage register including a second output adapted to provide said record data portion thereon, and means responsive to a signal from said recognition means indicative of a record of said first kind for gating signals derived at said second output to said data utilization means.

14. The apparatus of claim 13 wherein said data storage register includes a second input, means responsive to a true address comparison and said signal indicative of records of said first kind for gating a recording signal from said data utilization means to said second input, a third output of said data storage means adapted to provide said recording signal thereon, and recording means coupled to said third output.

15. Data processing apparatus for selectively addressing related records in search of a chosen record, each of said related records containing a record address and a data section and being disposed in at least a pair of data tracks on a medium, a track-linking record terminating a first one of said pair of tracks and including in the data section thereof the address of the first record in the other one of said pair of tracks; said data processing apparatus comprising:

address storage means adapted to initially store the address of a first one of said related records;

means for reading out the address of successive records disposed in said pair of tracks;

first comparator means for comparing each address read-out against the then-existing stored address;

means responsive to a "true" address comparison for transferring the data contents of the corresponding record read out by said readout means;

second comparator means for comparing the data contents of each record read out for transfer against data contents of said chosen record;

means for incrementing contents of said storage address register for each false comparison of said data contents; and means responsive to a true address comparison for transferring the data contents of said track-linking record to said address storage means upon the readout thereof.

16. Data processing apparatus adapted to address records in search of a chosen record, each record including a record address and data section, said records disposed in a plurality of data tracks on a medium and related records being grouped without regard to the number of portion of the tracks occupied by group in accordance with a key chosen from the data contents of said related records, said medium further including a track-linking record terminating each but the last track in each group and including in the data section thereof an address of the first record in the subsequent track of the same group, said data processing apparatus comprising:

means for translating the key of said chosen record into the address of the first record of a group wherein said chosen record is located;

address storage means for storing the address of said first group record;

readout means for reading out the address of successive records of said group;

first comparator means for comparing each address read out against the then existing stored address;

said readout means responsive to a true address comparison for readout of the data contents of each record for further transfer;

second comparator means for comparing the key of each of said transferred data contents against the key of said chosen record;

means for successively incrementing the contents of said stored address register for each false key comparison; and means for transferring data contents of said track-linking record to said address storage means in the presence of a true address comparison upon the readout of said track-linking record.

17. A system for processing data stored on a plurality of information units, each unit containing a predetermined number of data tracks in which records of indeterminate length are successively, magnetically recorded, each record comprising a header portion including a statement of the complete record address and a data portion including a key, said records being organized into groups each addressable through said keys and capable of occupying more than one track, each track of a multitrack group, except the last track, terminating with a track-linking record carrying unique indicia in its header portion and carrying in its data portion the address of the subsequent record belonging to the same group, means responsive to the key of a chosen record for generating the address of the first record of the group which includes said chosen record, address register means for storing said generated address, means responsive to said generated address for selecting the appropriate unit from said plurality of information units, means responsive to said generated address for addressing the appropriate track on said selected unit, means for successively reading out records from said last-recited track, means for recognizing said track-linking indicia, means for comparing the address contained in each record header portion against the address stored in said address register means, means responsive to a true address comparison for reading out the data portion of the corresponding record in the absence of a track-linking indicia recognition, means for comparing the key of said read out data portion against the key of said chosen record, means responsive to a false key comparison for incrementing the contents of said address register to address the subsequent record of said group, and means responsive to a true address comparison for a record in the presence of a track-linking indicia recognition for transferring the contents of the data portion of said last-recited record to said address register means.

References Cited

UNITED STATES PATENTS

| | | | |
|---|---|---|---|
| 2,978,175 | 4/1961 | Newman et al. | 235—157 |
| 3,161,855 | 12/1964 | Propster et al. | 340—172.5 |

PAUL J. HENON, *Primary Examiner.*

R. B. ZACHE, *Assistant Examiner.*